United States Patent
Joyce et al.

(10) Patent No.: US 8,255,493 B2
(45) Date of Patent: Aug. 28, 2012

(54) AUTOMATED DYNAMIC PORTLET RENDERING

(75) Inventors: Regina M. Joyce, Pittsburgh, PA (US);
Vijaykumar Palat, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 12/635,077

(22) Filed: Dec. 10, 2009

(65) Prior Publication Data

US 2011/0145364 A1 Jun. 16, 2011

(51) Int. Cl.
*G06F 15/16* (2006.01)
(52) U.S. Cl. ............. 709/219; 709/208; 715/230; 707/1
(58) Field of Classification Search .................. 709/208, 709/219; 715/230; 707/1
See application file for complete search history.

(56) References Cited

U.S. PATENT DOCUMENTS

| | | | | |
|---|---|---|---|---|
| 7,536,637 B1 * | 5/2009 | Nauerz et al. | ................. | 715/230 |
| 2006/0235935 A1 * | 10/2006 | Ng | ................. | 709/208 |

OTHER PUBLICATIONS

Yang Sie et al., Dynamically Hide Portlets at Request Time, Webpage/site: http://mail-archives.apache.org/mod_mbox/portals-jetspeed-dev/200705.mbox/%3CC5B94D120C2C0F48B538DEC0FFBD8226038C0AF2@MSGMROCLM2WIN.DMN1.FMR.COM%3E, May 11, 2007, pp. 1-2, portals.apache.org, Apache Software Foundation, Published on the World Wide Web.

Parul Seth et al., Add Portlet Dynamically With Portlet-Service, Webpage/site: http://www.liferay.com/web/guest/community/forums/-/message_boards/message/3575947, Jul. 2009, pp. 1-4, Lifeway Community Forums, Published on the World Wide Web.

* cited by examiner

*Primary Examiner* — Tammy Nguyen
(74) *Attorney, Agent, or Firm* — Lee Law, PLLC; Christopher B. Lee

(57) ABSTRACT

A portlet from a portal server is received at a computing device. A second server is queried for an initial portlet visibility rule for the portlet. The initial portlet visibility rule is received from the second server. A determination is made as to whether to render the portlet based upon the initial portlet visibility rule. The portlet is rendered in response to determining that the initial portlet visibility rule indicates to render the portlet.

17 Claims, 4 Drawing Sheets

100

US 8,255,493 B2

AUTOMATED DYNAMIC PORTLET RENDERING

BACKGROUND

The present invention relates to portlet application interface rendering. More particularly, the present invention relates to automated dynamic portlet rendering.

Computing devices may receive portlets from portal servers. A portlet provides an application interface to an application running on a portal server. A visibility state for a portlet is statically configured by the portal server for rendering during an entire session between the computing device and the portal server.

BRIEF SUMMARY

A method includes receiving, at a computing device, a portlet from a portal server; querying a second server for an initial portlet visibility rule for the portlet; receiving the initial portlet visibility rule from the second server; determining whether to render the portlet based upon the initial portlet visibility rule; and rendering the portlet in response to determining that the initial portlet visibility rule indicates to render the portlet.

A system includes a display; and a processor programmed to: receive a portlet from a portal server; query a second server for an initial portlet visibility rule for the portlet; receive the initial portlet visibility rule from the second server; determine whether to render the portlet based upon the initial portlet visibility rule; and render the portlet on the display in response to determining that the initial portlet visibility rule indicates to render the portlet.

A computer program product includes a computer readable storage medium including computer readable program code, wherein the computer readable program code when executed on a computer causes the computer to: receive a portlet from a portal server; query a second server for an initial portlet visibility rule for the portlet; receive the initial portlet visibility rule from the second server; determine whether to render the portlet based upon the initial portlet visibility rule; and render the portlet in response to determining that the initial portlet visibility rule indicates to render the portlet.

DETAILED DESCRIPTION

Figure 1:
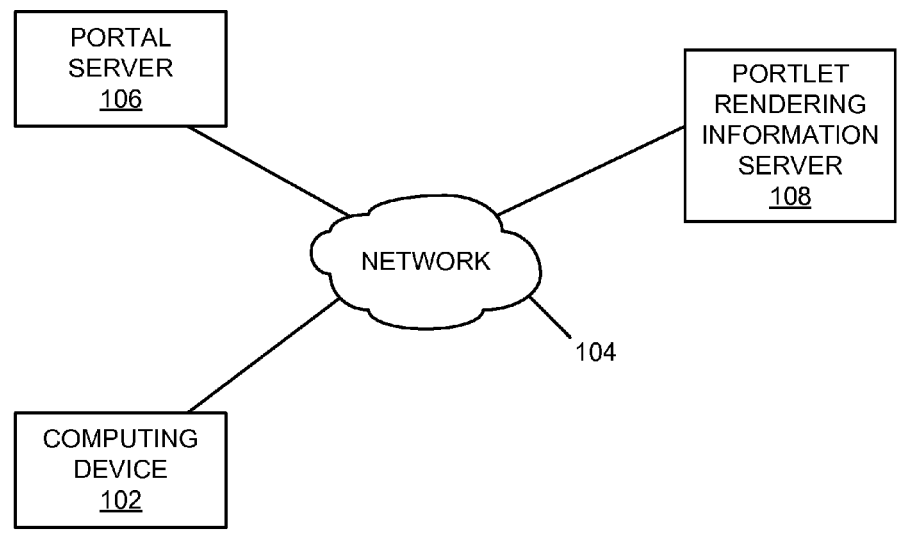
FIG. 1 is a block diagram of an example of an implementation of a system for automated dynamic portlet rendering according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated dynamic portlet rendering. Portlets may be received at a computing device from a portal server and a second server (hereinafter "third-party" server) may be queried for initial rendering instructions for the portal. The third-party may be located outside the portal framework of the portal server and the portlet application may then be used to dynamically hide or display a portlet based on user selections. As such, in response to a user interface event, the third-party server may be queried again with an indication of the user interface or other event that occurred. Updated rendering (e.g., visibility) instructions may be received from the third-party server. When the updated instructions indicate that a present rendered/visibility state of the portlet should be changed, the computing device changes the rendered/visibility state of the portlet (e.g., from visible to hidden, or from hidden to visible). As such, portlets may be dynamically displayed and hidden with their visibility terminated in response to instructions received from a third-party server other than the portal server that served the portlet. As such, portlet visibility rule processing for displaying portlets may be decoupled from the portal server.

The third-party application/server may be operated by a portlet application developer (e.g., a portlet provider). Alternatively, the third-party server may be owned by a party other than the portlet application developer. In either situation, the portlet provider may provide the portlet to a portal server for distribution. The portlet provider may also provide the third-party server, or any other published third-party service, with the portlet visibility rules for automated dynamic portlet rendering. As such, one server entity may host a portal server, while the portlet provider retains control over rendering of its developed portlets.

In such an implementation, a portlet developer/provider may choose to hide or show a particular feature via a portlet, while maintaining periods of time where the portlet is not displayed. For example, the portlet developer may create a set of portlet visibility rules, such as to render the portlet, for example, every Tuesday. The portlet visibility rules may further specify that the portlet should be rendered during one or more specific time periods, such as weeks or months.

The portlet developer may further protect revenues in an application sale situation, where the portlet developer sells the portlet to another company while ensuring that the portlet always checks with the portlet developer's server to determine whether to render the portlet. Royalties or other proceeds may be processed based upon rendering queries to the developer's third-party server.

The third-party application/server may manage the rules for visibility using information from the portal and from the portlet application to determine which portlets to render or not render. As such, the rendering instructions may be formed as portlet visibility rules. When a portlet is received at a computing device from the portal server, the third-party server may be queried for an initial portlet visibility rule for the portlet. The initial portlet visibility rule may indicate that the portlet is to be rendered or that the portlet is not to be rendered. In response to receipt of the initial portlet visibility rule from the third-party server, the computing device determines whether to render the portlet based upon the initial portlet visibility rule. The portlet may be rendered in response to determining that the initial portlet visibility rule indicates to render the portlet, or may not be rendered in response to determining that the initial portlet visibility rule indicates not to render the portlet.

The particular user interface or other event/trigger for the third-party server query for automated dynamic portlet rendering may be determined as appropriate for a given implementation. In response to a user interface or other event associated with the portlet, the third-party server may be queried for an updated portlet visibility rule including an indication of the detected user interface event. The updated portlet visibility rule associated with the detected user interface event may be received from the third-party server and the computing device may determine whether to change the present rendered state of the portlet based upon the updated portlet visibility rule. This process may be repeated for each user interface event or for other events to dynamically change a rendered state of the portlet in response to any such event.

Other events that may be used to dynamically change a rendered state of a portlet include events such as a change in a time of day, a change of a calendar date, or other changes as appropriate for a given implementation. In such an implementation, at least one of a time of day rendering criteria and a date rendering criteria may be received in association with a portlet visibility rule for the portlet. The computing device may determine whether to render the portlet based upon the updated portlet visibility rule based upon a determination of whether a current time of day matches the time of day rendering criteria or whether a current date matches the date rendering criteria. Additionally, an indication from a clock module of a new time of day or a new date may be considered events for purposes of the present subject matter. In response to such an event, the computing device may determine whether to render or terminate rendering of the portlet based upon either the time of day rendering criteria or the date rendering criteria for the portlet. For example, sports are seasonal events. As such, a sport score portlet may be configured to display sport scores for a respective sport during a season associated with the sport and to hide the portlet for times that are out of season for the sport. Many other variations of event processing with portlet visibility rules are possible and all are considered within the scope of the present subject matter.

The automated dynamic portlet rendering described herein may be based upon computing devices and user selections for both anonymous and authenticated users. For a user authenticated implementation, automated dynamic portlet rendering may be associated with and processed in association with user identities to dynamically change a portlet rendering state uniquely for each user of a portlet. User identities may be authenticated via the third-party server. In such an implementation, a user attribute (e.g., a user identifier, user name, or other attribute) associated with a user that generated a user interface event associated with a portlet may be determined. The third-party server may be queried for the updated portlet visibility rule with the indication of the detected user interface event using the user attribute. The computing device may then receive an updated portlet visibility rule associated with the detected user interface event and the user attribute from the second (e.g., third-party) server. As such, dynamic portlet visibility rules may be associated with each user for each user interface event associated with a portlet.

Portlet rendering may be implemented, as one example, using asynchronous JavaScript® and extensible markup language (XML), collectively known as AJAX, and dynamic hypertext markup language (HTML). Using either AJAX or HTML, the portlet may be rendered or hidden based upon the portlet visibility rules independently of the portal server's understanding or awareness of events of the user interface associated with the portlet.

As one example of a way to render or hide (e.g., terminate rendering of) a portlet, an HTML Style tag, such as an HTML DIV tag, for the portlet may be set or cleared. In such an implementation, the Style tag associated with the HTML DIV tag may be set to "None" (e.g., Style:none) to terminate rendering of the portlet. The Style tag may be set to an appropriate value to re-establish display of the portlet.

It is further noted that in certain portal environments, each portlet may be rendered in a skin which contains an HTML DIV tag that identifies the portlet. In such an implementation, the HTML DIV tag associated with the portlet skin may be used to render or terminate rendering of the portlet.

Many communication or interface possibilities exist for communication between the portlet and a third-party service, such as the third-party server. For example, one or more JavaScript® functions may be used to connect to and communicate with the third-party server to determine whether the portlet should be displayed at any given point in time and/or in response to user interface or other events. If the JavaScript® function determines that the portlet should be hidden, the JavaScript® function may apply a "Style:none" setting to the contents of the DIV tag rendering it invisible to the user. Additionally, the DIV tag may be set to default to none and only appear when the JavaScript® function determines that the portlet should be rendered.

The JavaScript® function may be part of the portlet if data from the portlet is to be sent to the third-party service. Alternatively, the JavaScript® function may be a part of a theme or framework if no portlet data is to be sent to the third-party service. Using this approach, an entire portlet, including the skin, may be hidden. As such, the present subject matter also allows for visibility of a portlet to be based on virtually any type of data. The present subject matter also avoids processing on a portal server, which may become costly for dynamic portlet rendering as described herein.

The automated dynamic portlet rendering described herein may be performed in real time to allow prompt rendering and termination of rendering for portlet user interfaces. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated dynamic portlet rendering. A computing device 102 communicates via a network 104 with a portal server 106 and a portlet rendering information server 108. The portal server 106 provides storage and retrieval access for portlets to the client device 102. The portlet rendering information server 108 represents a third-party server that stores and provides portlet rendering information, such as portlet visibility rules, to the computing device 102. As described above and in more detail below, the portlet rendering information allows the computing device 102 to determine whether to render or hide a particular portlet dynamically based upon user interface or other events or triggers.

As will be described in more detail below in association with FIG. 2 through FIG. 4, the computing device 102 provides automated dynamic portlet rendering. The automated dynamic portlet rendering is based upon rendering information received from the portlet rendering information server 108. The automated dynamic portlet rendering may be performed in response to initial rendering information and may also be performed in response to updated event-based rendering information, as described in more detail below.

It should be noted that the computing device 102 may be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
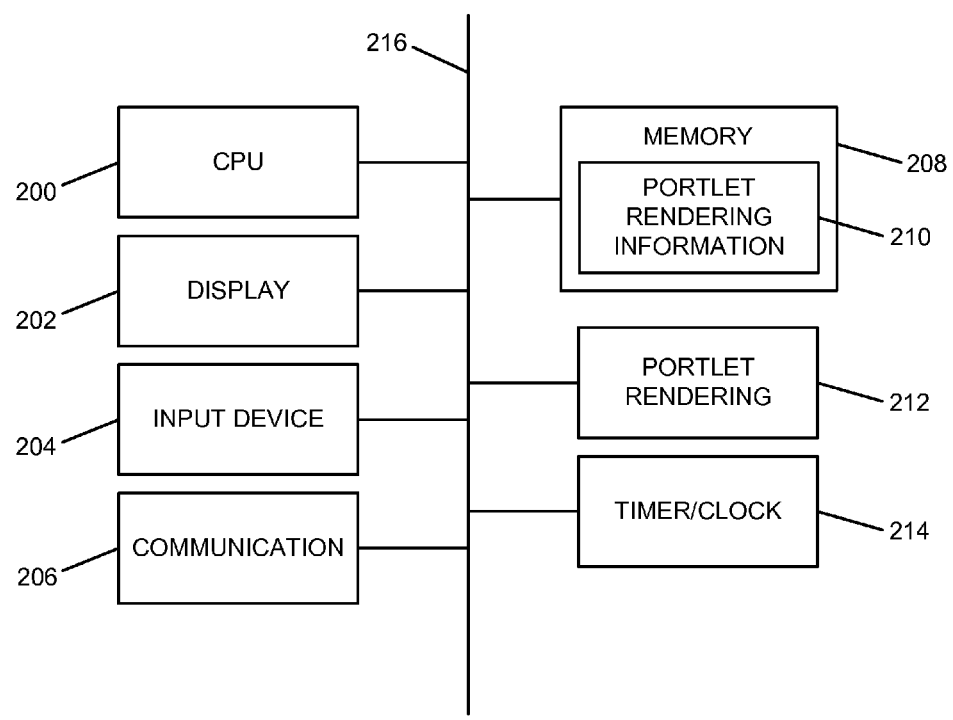
FIG. 2 is a block diagram of an example of an implementation of a computing device capable of performing automated dynamic portlet rendering according to an embodiment of the present subject matter.

FIG. 2 is a block diagram of an example of an implementation of the computing device 102 capable of performing automated dynamic portlet rendering. A central processing unit (CPU) 200 provides computer instruction execution, computation, and other capabilities within the computing device 102. A display 202 provides visual information to a user of the computing device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

A communication module 206 provides interconnection capabilities that allow the computing device 102 to communicate with other modules within the system 100, such as the portal server 106 and the portlet rendering information server 108, to provide the automated dynamic portlet rendering described herein. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a portlet rendering information storage area 210 that stores portlet rendering information received from the portlet rendering information server 108 for the computing device 102. As will be described in more detail below, the portlet rendering information stored within the portlet rendering information storage area 210 is used to determine whether to render portlets dynamically in response to events associated with the computing device 102. The portlet rendering information stored in the portlet rendering information storage area 210 may include portlet rendering information, such as portlet visibility rules, as described above and in more detail below.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A portlet rendering module 212 is also illustrated. The portlet rendering module 212 provides portlet rendering determination and control for the computing device 102, as described above and in more detail below. The portlet rendering module 212 implements the automated dynamic portlet rendering of the computing device 102.

Though the portlet rendering module 212 is illustrated as a component-level module for ease of illustration and description purposes, it should be noted that the portlet rendering module 212 may include any hardware, programmed processor(s), and memory used to carry out the functions of this module as described above and in more detail below. For example, the portlet rendering module 212 may include additional controller circuitry in the form of application specific integrated circuits (ASICs), processors, and/or discrete integrated circuits and components for performing communication and electrical control activities associated with the respective devices. Additionally, the portlet rendering module 212 may also include interrupt-level, stack-level, and application-level modules as appropriate. Furthermore, the portlet rendering module 212 may include any memory components used for storage, execution, and data processing for performing processing activities associated with the module.

It should also be noted that the portlet rendering module 212 may form a portion of other circuitry described without departure from the scope of the present subject matter. Further, the portlet rendering module 212 may alternatively be implemented as an application stored within the memory 208. In such an implementation, the portlet rendering module 212 may include instructions executed by the CPU 200 for performing the functionality described herein. The CPU 200 may execute these instructions to provide the processing capabilities described above and in more detail below for the computing device 102. The portlet rendering module 212 may form a portion of an interrupt service routine (ISR), a portion of an operating system, a portion of a browser application, or a portion of a separate application without departure from the scope of the present subject matter.

A timer/clock module 214 is illustrated and used to determine timing and date information, as described above and in more detail below. Information derived from the timer/clock module 214 allows the portlet rendering module 212 to determine changes in time and date for use in portlet rendering determinations. As such, the portlet rendering module 212 may utilize information derived from the timer/clock module 214 for information processing activities, such as the automated dynamic portlet rendering described herein.

The CPU 200, the display 202, the input device 204, the communication module 206, the memory 208, the portlet rendering module 212, and the timer/clock module 214 are interconnected via an interconnection 216. The interconnection 216 may include a system bus, a network, or any other interconnection capable of providing the respective components with suitable interconnection for the respective purpose.

While the computing device 102 is illustrated with and has certain components described, other modules and components may be associated with the computing device 102 without departure from the scope of the present subject matter. Additionally, it should be noted that, while the computing device 102 is described as a single device for ease of illustration purposes, the components within the computing device 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the computing device 102 are possible and all are considered within the scope of the present subject matter. Accordingly, the computing device 102 may take many forms and may be associated with many platforms.

Figure 3:
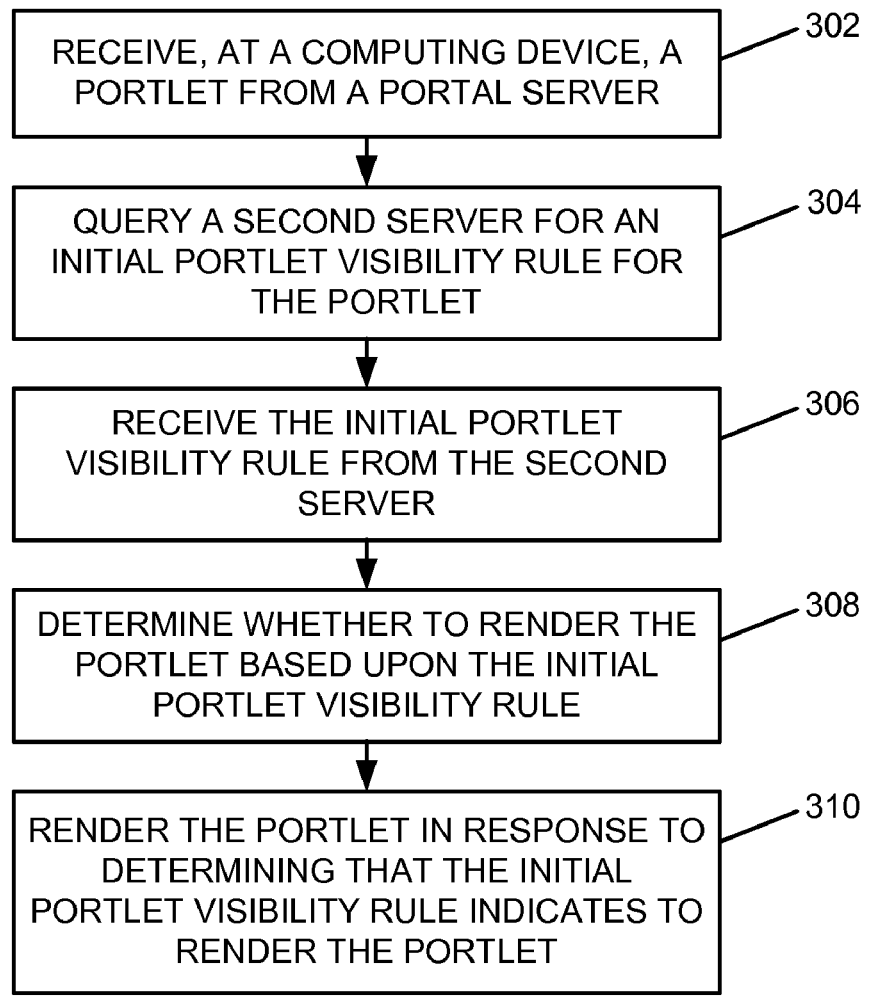
FIG. 3 is a flow chart of an example of an implementation of a process for automated dynamic portlet rendering according to an embodiment of the present subject matter.
Figure 4:
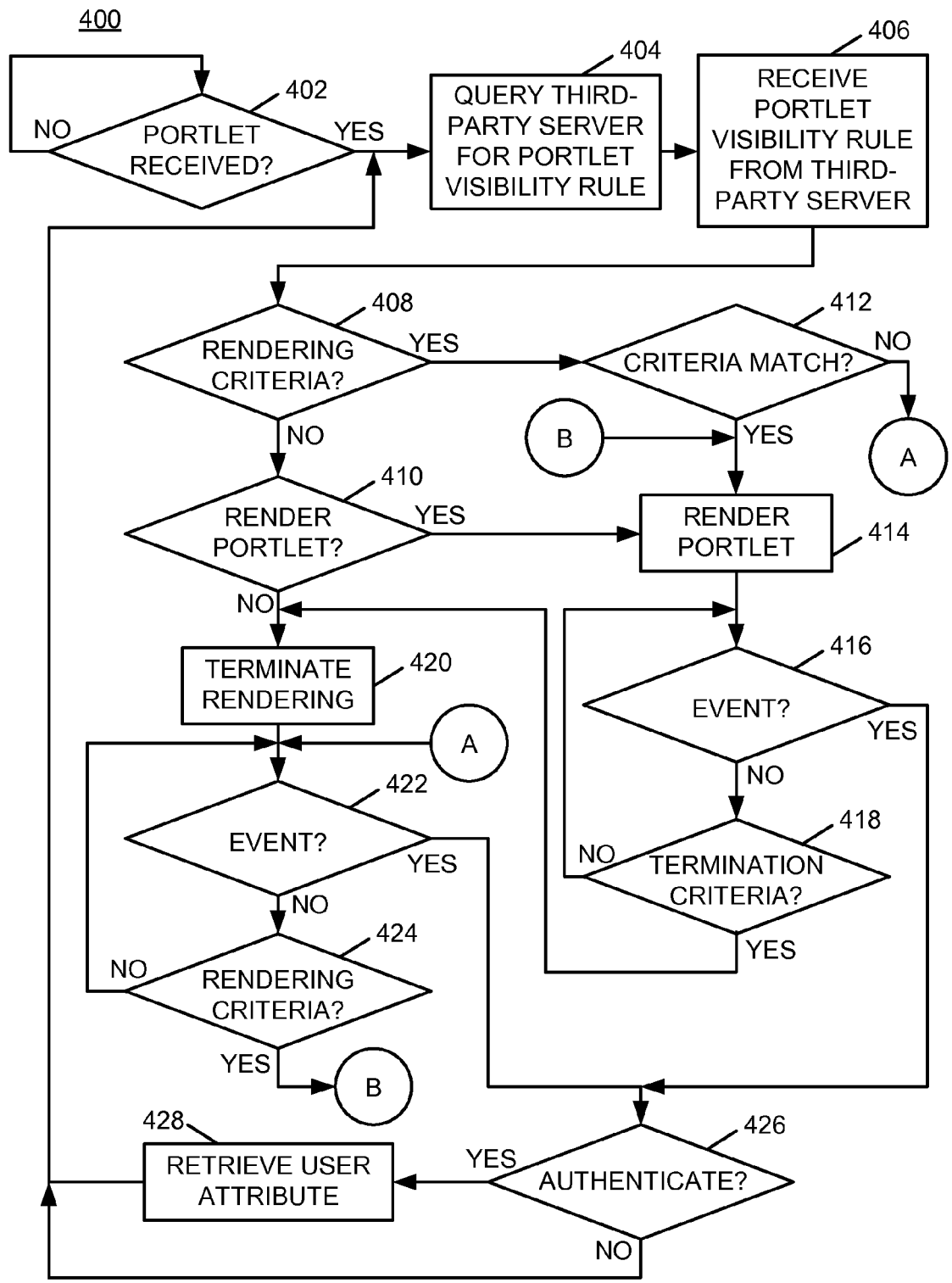
FIG. 4 is a flow chart of an example of an implementation of a process for automated dynamic portlet rendering according to an embodiment of the present subject matter.

FIG. 3 through FIG. 4 below describe example processes that may be executed by devices, such as the computing device 102, to perform the automated dynamic portlet rendering associated with the present subject matter. Many other variations on the example processes are possible and all are considered within the scope of the present subject matter. The example processes may be performed by modules, such as the portlet rendering module 212 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated dynamic portlet rendering. At block 302, the process 300 receives, at a computing device, a portlet from a portal server. At block 304, the process 300 queries a second server for an initial portlet visibility rule for the portlet. At block 306, the process 300 receives the initial portlet visibility rule from the second server. At block 308, the process 300 determines whether to render the portlet based upon the initial portlet visibility rule. At block 310, the process 300 renders the portlet in response to determining that the initial portlet visibility rule indicates to render the portlet.

FIG. 4 is a flow chart of an example of an implementation of a process 400 for automated dynamic portlet rendering. At decision point 402, the process 400 waits for a portlet to be received at a computing device, such as the computing device 102. When a determination is made that a portlet has been received, the process 400 queries a third-party server for a portlet visibility rule for the portlet at block 404. It should be noted that the process 400 will iterate as described below and may further query the third-party server for updated portlet visibility rules for the portlet in response to events associated with the computing device. At block 406, the process 400 receives the portlet visibility rule from the third-party server.

At decision point 408, the process 400 makes a determination as to whether rendering criteria have been received in association with the portlet visibility rule. As described above, and in more detail below, rendering criteria may include a time of day rendering criteria in the form of a timeframe or time period for rendering the portlet. Rendering criteria may also include date rendering criteria having a date range or date period for rendering or not rendering the portlet.

When a determination is made at decision point 408 that rendering criteria have not been received in association with the portlet visibility rule, the process 400 makes a determination at decision point 410 as to whether to render the portlet based upon the portlet visibility rule. The portlet visibility rule may include a binary indication of whether to render or not render the portlet. Additional description of the processing associated with decision point 410 will be deferred and described further below.

Returning to the description of decision point 408, when a determination is made that rendering criteria have been received in association with the portlet visibility rule, the process 400 makes a determination as to whether there is a criteria match for rendering the portlet at decision point 412. For example, the process 400 may make a determination as to whether one of a current time of day matches time of day rendering criteria, or whether a current date matches date rendering criteria. Many other possibilities exist for criteria matching for rendering a portlet and all are considered within the scope of the present subject matter. Description of processing for a negative determination of a criteria match at decision point 412 will be deferred and described in more detail further below.

Returning to the description of decision point 410, when a determination is made to render the portlet based upon the portlet visibility rule, or when a determination is made at decision point 412 that a rendering criteria match has been identified, the process 400 renders the portlet at block 414. As described above, rendering the portlet may include changing a setting for a Style tag associated with an HTML DIV tag to a Style appropriate for rendering the portlet. As described above, the description of processing for negative determinations at decision points 410 and 412 will be deferred and described in more detail further below in favor of a description of event processing associated with the process 400.

At decision point 416, the process 400 makes a determination as to whether an event, such as a user interface event or an event associated with a clock module, such as the timer/clock module 214, has been detected. A description of affirmative decision processing at decision point 416 will be described in more detail further below. When a determination is made at decision point 416 that a user interface event or a clock module event have not been detected, the process 400 makes a determination at decision point 418 as to whether any termination criteria have been matched. As described above, rendering criteria, such as termination criteria may include time of day termination criteria for terminating rendering of the portlet, and may also include date termination criteria for terminating display of the portlet. As such, the process 400 may determine whether a current time of day matches time of day terminating criteria or whether a current date matches date terminating criteria for the portlet. When a determination is made at decision point 418 that there has not been a termination criteria match, the process 400 returns to decision point 416 and iterates as described above to wait for user interface or clock module events.

When a determination is made at decision point 418 that termination criteria have been matched, or to continue with the description of decision point 410 deferred above, when a determination is made at decision point 410 not to render the portlet based upon the portlet visibility rule, the process 400 terminates rendering of the portlet at block 420. As described above, termination of rendering of the portlet may include changing a setting of a Style tag associated with an HTML DIV tag to an appropriate value, such as "Style:none," to terminate rendering of the portlet.

Returning to the description of decision point 412, when a determination is made that a rendering criteria match has not been identified, or upon completion of terminating rendering of the portlet at block 420, the process 400 makes a determination at decision point 422 as to whether a user interface or clock module event has been detected. As described above, an event associated with a clock module may include an indication of a new time of day or a new date among other possible indications. When a determination is made at decision point 422 that a user interface event or a clock module event has not been detected, the process 400 determines whether there has been a rendering criteria match at decision point 424. As a complementary operation to decision point 418 described above, a rendering criteria match may include determining that a current time of day matches a time of day rendering criteria or that a current date matches a date rendering criteria, among other possibilities. When a determination is made at decision point 424 that rendering criteria have not been matched, the process 400 returns to decision point 422 and iterates as described above.

As with decision point 416 above, a description of affirmative decision processing at decision point 422 will be described in more detail below. When a determination is made at decision point 424 that there has been a rendering criteria match, the process 400 returns to block 414 and renders the portlet as described above. The process 400 iterates as described above between event detection and termination criteria matching at decision points 416 and 418, and event detection and rendering criteria matching at decision points 422 and 424, respectively, as described above.

Returning to the description of affirmative decision processing at decision point 416 and at decision point 422, when a user interface event or a clock module event has been detected at either decision point 416 or decision point 422, the process 400 makes a determination at decision point 426 as to whether to authenticate a request for an updated portlet visibility rule. When a determination is made at decision point 426 to authenticate a request for an updated portlet visibility rule, the process 400 retrieves a user attribute (e.g., a user identifier, user name, or other attribute) associated with the user of the portlet at block 428. For example, the process 400 may determine a user attribute associated with a user that generated the user interface event associated with the portlet.

When a determination is made at decision point 426 not to authenticate a request for an updated portlet visibility rule or upon retrieving the user attribute at block 428, the process 400 returns to block 404, queries the third-party server for the updated portlet visibility rule, and iterates as described above. It should be understood that when a user attribute is retrieved, that user attribute may be included with the query and a portlet visibility rule tailored to the specific user may be received in response to the query from the third-party server. Further, an indication of the detected time or date change event may also be included in the query of the third-party server. As such, the process 400 may query the third-party server for the updated portlet visibility rule, including the indication of the detected user interface event and/or the detected time or date change event using the user attribute if authentication of the updated portlet visibility rule has been used at block 404. The process 400 may also receive the updated portlet visibility rule associated with the detected user interface event and/or the detected time or date change event, and the user attribute from the third-party server at block 406.

The process 400 iterates as described above to make rendering determination decisions for the portlet based upon criteria matching and new user interface or clock module events. Returning to the description of decision point 412, when a determination is made that there has not been a criteria match, the process 400 continues to decision point 422 and iterates as described above.

As such, the process 400 receives a portlet from a portal server and queries a third-party server for a portlet visibility rule. The portlet visibility rule may include a binary indication of whether to render the portlet or not to render the portlet and may also include rendering criteria. Rendering criteria may be processed to determine whether to render or terminate rendering of the portlet dynamically in association with event processing. User interface events and clock module events may also be detected and processed. In response to such events, the process 400 queries a third-party server for an updated portlet visibility rule, including an indication of the detected user interface event. The process 400 receives the updated portlet visibility rule associated with the detected user interface event from the third-party server and determines whether to change a rendered state of the portet based upon the updated portlet visibility rule. The process 400 changes the rendered state of the portlet in response to determining that the updated portlet visibility rule includes an indication to change the rendered state of the portlet. The process 400 also makes a determination as to whether to authenticate requests for updated portlet visibility rules based upon a user attribute associated with a user that generated a user interface event associated with the portlet.

It should further be noted that a date change or a time change that is detected in association with a clock module may also result in the process 400 querying the third-party server for an updated portlet visibility rule, including an indication of the detected time or date change event. The process 400 may receive the updated portlet visibility rule associated with the detected time or date change event that includes time of day rendering or termination criteria and/or date rendering or termination criteria for the portlet from the third-party server. The process 400 may process the updated portlet visibility rule as described above to determine whether to change a rendered state of the portlet in response to the updated portlet visibility rule.

As described above in association with FIG. 1 through FIG. 4, the example systems and processes provide automated dynamic portlet rendering. Many other variations and additional activities associated with automated dynamic portlet rendering are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising: receiving, at a computing device, a portlet from a portal server; querying a second server for an initial portlet visibility rule for the portlet; receiving the initial portlet visibility rule from the second server; determining whether to render the portlet based upon the initial portlet visibility rule; and rendering the portlet in response to determining that the initial portlet visibility rule indicates to render the portlet, further comprising: detecting a user interface event associated with the portlet; querying the second server for an updated portlet visibility rule comprising an indication of the detected user interface event; receiving the updated portlet visibility rule associated with the detected user interface event from the second server; determining whether to change a rendered state of the portlet based upon the updated portlet visibility rule; and changing the rendered state of the portlet in response to determining that the updated portlet visibility rule comprises an indication to change the rendered state of the portlet.

2. The method of claim 1 further comprising: determining a user attribute associated with a user that generated the user interface event associated with the portlet; and where querying the second server for the updated portlet visibility rule comprising the indication of the detected user interface event comprises querying the second server for the updated portlet visibility rule using the user attribute; and where receiving the updated portlet visibility rule associated with the detected user interface event from the second server comprises receiving the updated portlet visibility rule associated with the detected user interface event and the user attribute from the second server.

3. The method of claim 2, further comprising: determining whether to provide user authentication for the updated portlet visibility rule; and where querying the second server for the updated portlet visibility rule using the user attribute comprises querying the second server for the updated portlet visibility rule using the user attribute in response to determining to provide the user authentication for the updated portlet visibility rule.

4. The method of claim 1, where the updated portlet visibility rule from the second server comprises at least one of time of day rendering criteria and date rendering criteria for the portlet and where determining whether to change the rendered state of the portlet based upon the updated portlet visibility rule comprises determining whether one of a current time of day matches the time of day rendering criteria and whether a current date matches the date rendering criteria.

5. The method of claim 1, where changing the rendered state of the portlet in response to determining that the updated portlet visibility rule indicates to change the rendered state of the portlet comprises changing a setting of a Style tag associated with a hypertext markup language (HTML) DIV tag.

6. The method of claim 1, further comprising: detecting an event associated with at least one of a time change and a date change from a clock module; querying the second server for an updated portlet visibility rule comprising an indication of the detected at least one of the time change and the date change event; receiving the updated portlet visibility rule associated with the detected at least one of the time change and the date change event comprising at least one of time of day rendering criteria and date rendering criteria for the portlet from the second server; determining whether to change a rendered state for the portlet based upon at least one of the time of day rendering criteria and the date rendering criteria; and changing the rendered state of the portlet in response to determining to change the rendered state of the portlet based upon the updated portlet visibility rule.

7. A system, comprising: a display; and a processor programmed to: receive a portlet from a portal server; query a second server for an initial portlet visibility rule for the portlet; receive the initial portlet visibility rule from the second server; determine whether to render the portlet based upon the initial portlet visibility rule; and render the portlet on the display in response to determining that the initial portlet visibility rule indicates to render the portlet, where the processor is further programmed to: detect a user interface event associated with the portlet; query the second server for an updated portlet visibility rule comprising an indication of the detected user interface event; receive the updated portlet visibility rule associated with the detected user interface event from the second server; determine whether to change a rendered state of the portlet based upon the updated portlet visibility rule; and change the rendered state of the portlet in response to determining that the updated portlet visibility rule comprises an indication to change the rendered state of the portlet.

8. The system of claim 7, where the processor is further programmed to: determine a user attribute associated with a user that generated the user interface event associated with the portlet; and where, in being programmed to query the second server for the updated portlet visibility rule comprising the indication of the detected user interface event, the processor is programmed to query the second server for the updated portlet visibility rule using the user attribute; and where, in being programmed to receive the updated portlet visibility rule associated with the detected user interface event from the second server, the processor is programmed to receive the updated portlet visibility rule associated with the detected user interface event and the user attribute from the second server.

9. The system of claim 8, where the processor is further programmed to: determine whether to provide user authentication for the updated portlet visibility rule; and where, in being programmed to query the second server for the updated portlet visibility rule using the user attribute, the processor is programmed to query the second server for the updated portlet visibility rule using the user attribute in response to determining to provide the user authentication for the updated portlet visibility rule.

10. The system of claim 7, where the updated portlet visibility rule from the second server comprises at least one of time of day rendering criteria and date rendering criteria for the portlet and where, in being programmed to determine whether to change the rendered state of the portlet based upon the updated portlet visibility rule, the processor is programmed to determine whether one of a current time of day matches the time of day rendering criteria and whether a current date matches the date rendering criteria.

11. The system of claim 7, further comprising: a clock module; and where the processor is further programmed to: detect an event associated with at least one of a time change and a date change from the clock module; query the second server for an updated portlet visibility rule comprising an indication of the detected at least one of the time change and the date change event; receive the updated portlet visibility rule associated with the detected at least one of the time change and the date change event comprising at least one of time of day rendering criteria and date rendering criteria for the portlet from the second server; determine whether to change a rendered state for the portlet based upon at least one of the time of day rendering criteria and the date rendering criteria; and change the rendered state of the portlet in response to determining to change the rendered state of the portlet based upon the updated portlet visibility rule.

12. A computer program product comprises a computer readable storage device including computer readable program code, wherein the computer readable program code when executed on a computer causes the computer to: receive a portlet from a portal server; query a second server for an initial portlet visibility rule for the portlet; receive the initial portlet visibility rule from the second server; determine whether to render the portlet based upon the initial portlet visibility rule; and render the portlet in response to determining that the initial portlet visibility rule indicates to render the portlet, where the computer readable program code when executed on the computer further causes the computer to: detect a user interface event associated with the portlet; query the second server for an updated portlet visibility rule comprising an indication of the detected user interface event; receive the updated portlet visibility rule associated with the detected user interface event from the second server; determine whether to change a rendered state of the portlet based upon the updated portlet visibility rule; and change the rendered state of the portlet in response to determining that the updated portlet visibility rule comprises an indication to change the rendered state of the portlet.

13. The computer program product of claim 12, where the computer readable program code when executed on the computer further causes the computer to: determine a user attribute associated with a user that generated the user interface event associated with the portlet; and where, in causing the computer to query the second server for the updated portlet visibility rule comprising the indication of the detected user interface event, the computer readable program code when executed on the computer causes the computer to query the second server for the updated portlet visibility rule using the user attribute; and where, in causing the computer to receiving the updated portlet visibility rule associated with the detected user interface event from the second server, the computer readable program code when executed on the computer causes the computer to receive the updated portlet visibility rule associated with the detected user interface event and the user attribute from the second server.

14. The computer program product of claim 13 where the computer readable program code when executed on the computer further causes the computer to: determine whether to provide user authentication for the updated portlet visibility rule; and where, in causing the computer to determine whether to query the second server for the updated portlet visibility rule using the user attribute, the computer readable program code when executed on the computer further causes the computer to query the second server for the updated portlet visibility rule using the user attribute in response to determining to provide user authentication for the updated portlet visibility rule.

15. The computer program product of claim 12, where the updated portlet visibility rule from the second server comprises at least one of time of day rendering criteria and date rendering criteria for the portlet and where, in causing the computer to determine whether to change the rendered state of the portlet based upon the updated portlet visibility rule, the computer readable program code when executed on the computer causes the computer to determine whether one of a current time of day matches the time of day rendering criteria and whether a current date matches the date rendering criteria.

16. The computer program product of claim 12, where, in causing the computer to change the rendered state of the portlet in response to determining that the updated portlet visibility rule indicates to change the rendered state of the portlet, the computer readable program code when executed on the computer causes the computer to change a setting of a Style tag associated with a hypertext markup language (HTML) DIV tag.

17. The computer program product of claim 12, where the computer readable program code when executed on the computer further causes the computer to: detect an event associated with at least one of a time change and a date change from a clock module; query the second server for an updated portlet visibility rule comprising an indication of the detected at least one of the time change and the date change event; receive the updated portlet visibility rule associated with the detected at least one of the time change and the date change event comprising at least one of time of day rendering criteria and date rendering criteria for the portlet from the second server; determine whether to change a rendered state for the portlet based upon at least one of the time of day rendering criteria and the date rendering criteria; and change the rendered state of the portlet in response to determining to change the rendered state of the portlet based upon the updated portlet visibility rule.

* * * * *